United States Patent [19]
Fujiwara et al.

[11] Patent Number: 5,459,542
[45] Date of Patent: Oct. 17, 1995

[54] IMAGE-BLUR PREVENTING APPARATUS

[75] Inventors: Akihiro Fujiwara, Yokosuka; Kazuhiro Noguchi, Kawasaki; Tsuyoshi Morofuji, Yokohama, all of Japan

[73] Assignee: Canon Kabushiki Kaisha, Tokyo, Japan

[21] Appl. No.: 170,781

[22] Filed: Dec. 21, 1993

[30] Foreign Application Priority Data

Dec. 25, 1992 [JP] Japan .................................. 4-346707

[51] Int. Cl.⁶ .................................................. G03B 5/00
[52] U.S. Cl. .................................................. 354/202
[58] Field of Search ............................ 354/430, 65, 202, 354/195.1, 402, 403; 348/208; 359/554–557

[56] References Cited

U.S. PATENT DOCUMENTS

| | | | |
|---|---|---|---|
| 5,012,270 | 4/1991 | Sekine et al. | 354/430 |
| 5,175,580 | 12/1992 | Shiomi | 354/430 X |
| 5,231,445 | 7/1993 | Onuki et al. | 354/430 X |
| 5,262,820 | 11/1993 | Tamai et al. | 354/430 X |
| 5,291,300 | 3/1994 | Ueda | 354/430 X |

*Primary Examiner*—W. B. Perkey
*Attorney, Agent, or Firm*—Fitzpatrick, Cella, Harper & Scinto

[57] ABSTRACT

An image-blur preventing apparatus includes an image-blur correcting device that is driven in accordance with a subject distance to compensate for the location of an image-blur correcting optical device being located at a position different from a rotational center of the apparatus corresponding to rotational displacement due to a hand shake. The rotational center can be specified at a constant point, and a simple relationship between the needed correction and the subject distance can be established, thereby enabling image-blur prevention.

28 Claims, 4 Drawing Sheets

IMAGE-BLUR PREVENTING APPARATUS

BACKGROUND OF THE INVENTION

1. Field of the Invention

The present invention relates to an image-blur preventing apparatus used in an optical instrument such as a silver-salt camera or a video camera.

2. Description of the Related Art

First described briefly with reference to FIG. 4 is the conventional technology related to the image-blur preventing apparatus to which the present invention is directed.

FIG. 4 is a block diagram to show the structure of a conventional image-blur preventing apparatus, in which reference numeral 1 designates a vibration gyro for detecting a shake of the apparatus as an angular velocity and outputting an angular velocity signal 2 as a detection output, and 3 an integration circuit for integrating the angular velocity signal 2 and outputting the integration result as an angular displacement signal 4 corresponding to an angle of deflection of the apparatus.

Numeral 20 denotes a variable (apical) angle prism (hereinafter referred to as VAP), which changes its apical angle to deflect a passing beam and to change an incident angle thereof into a lens unit 21, whereby blur correction is effected.

Numeral 15 denotes an actuator for changing the apical angle of VAP 20, which is driven by a drive control signal 14 from a drive control circuit 13.

Numeral 18 represents an apical angle sensor for detecting a displacement in apical angle of VAP 20, which obtains VAP apical angle displacement information 17 for example by an optical detection method and outputs a VAP apical angle displacement signal 19.

Numeral 9 is an adder, which adds the above VAP apical angle displacement signal 19 and the angular displacement signal 4 in opposite polarities and outputs the calculation result as a differential signal 10.

Numeral 10 is an amplifier, which amplifies the differential signal 10 to output an amplified differential signal 12. The amplified differential signal 12 is input into the drive control circuit 13. The drive control circuit 13 outputs the drive control signal 14 based on the amplified differential signal, as described above, and controls the drive of actuator 15.

A closed loop is formed by the group of components including (in a clockwise direction as depicted in FIG. 4) the adder 9, to the apical angle sensor 18, and each component in between. The closed loop functions to perform a control to keep the differential signal 10 always zero. As a result, the VAP apical angle displacement signal 19 is kept to coincide with the angular displacement signal 4, whereby the VAP 20 is driven by the apical angle displacement corresponding to an amount of the thus detected shake.

A beam 222 changed in incident angle by the VAP 20 is focused on the surface of CCD 223 by the lens unit 21. The conventional CCD 23 outputs an image signal 24.

FIG. 5 is a drawing to illustrate the operation of the apparatus in the conventional example shown in FIG. 4, showing a case in which a hand shake or the like inclines the camera system including the image-blur preventing apparatus at an angle θ downward about the point C. Next described referring to FIG. 5 are problems in the conventional image-blur preventing apparatus.

When shake detecting means including the vibration gyro 1 detects that the system is inclined at an angle θ downward, a blur correction operation is carried out such that the apical angle of VAP 220 (which is shown in FIG. 5 and is located immediately before the lens 221 on the optical axis thereof as shown in FIG. 4) is adjusted to incline upward by θ the optical axis which was inclined downward by θ with respect to the optical axis before being inclined. Then the inclination of the optical axis of an incident beam is corrected, whereby the camera system maintains the angle before inclination. It should be noted, however that the correction is only the angle is corrected in the conventional example and that an incident beam into the lens 21 is changed from $B_1$ to $B_2$ in the conventional example. Supposing a subject is at a distance equivalent to infinity, the blur correction is perfect in this conventional apparatus, because beams from $B_1$ and from $B_2$ can be deemed as being emitted from a single point. However, supposing a subject is at a finite distance L, a corresponding point on the subject moves from $P_1$ to $P_2$, producing an error angle α to also be corrected. Therefore, the correction is not perfect in this case. This error angle α in FIG. 5 is caused by the occurrence a shift change in the arrangement in which the rotation center of the camera is at the point C, apart from the correction optical member including VAP 20.

SUMMARY OF THE INVENTION

One aspect of the present invention is a control apparatus for preventing an image blur, comprising:

drive control means for outputting a drive control signal for driving an image-blur preventing portion for performing image blur prevention in accordance with an output from an image-blur detecting portion for detecting an image blur and with a distance to an object. This arrangement enables more accurate image blur prevention.

Another aspect of the present invention is a control apparatus for preventing an image blur, comprising:

drive control means for outputting a drive control signal for driving an image-blur preventing portion for performing image blur prevention in accordance with an output from an image-blur detecting portion for detecting an image blur and with a focusing state of an optical system. This arrangement also enables more accurate image blur prevention.

Further, another aspect of the present invention is a control apparatus for preventing an image blur, comprising:

drive control means for outputting a drive control signal for changing an operation of an image-blur preventing portion for performing image blur prevention, in accordance with a distance to an object or in accordance with a focusing state of an optical system. This arrangement also enables more accurate image blur prevention operation.

DETAILED DESCRIPTION OF THE PREFERRED EMBODIMENTS

First Embodiment

Figure 1:
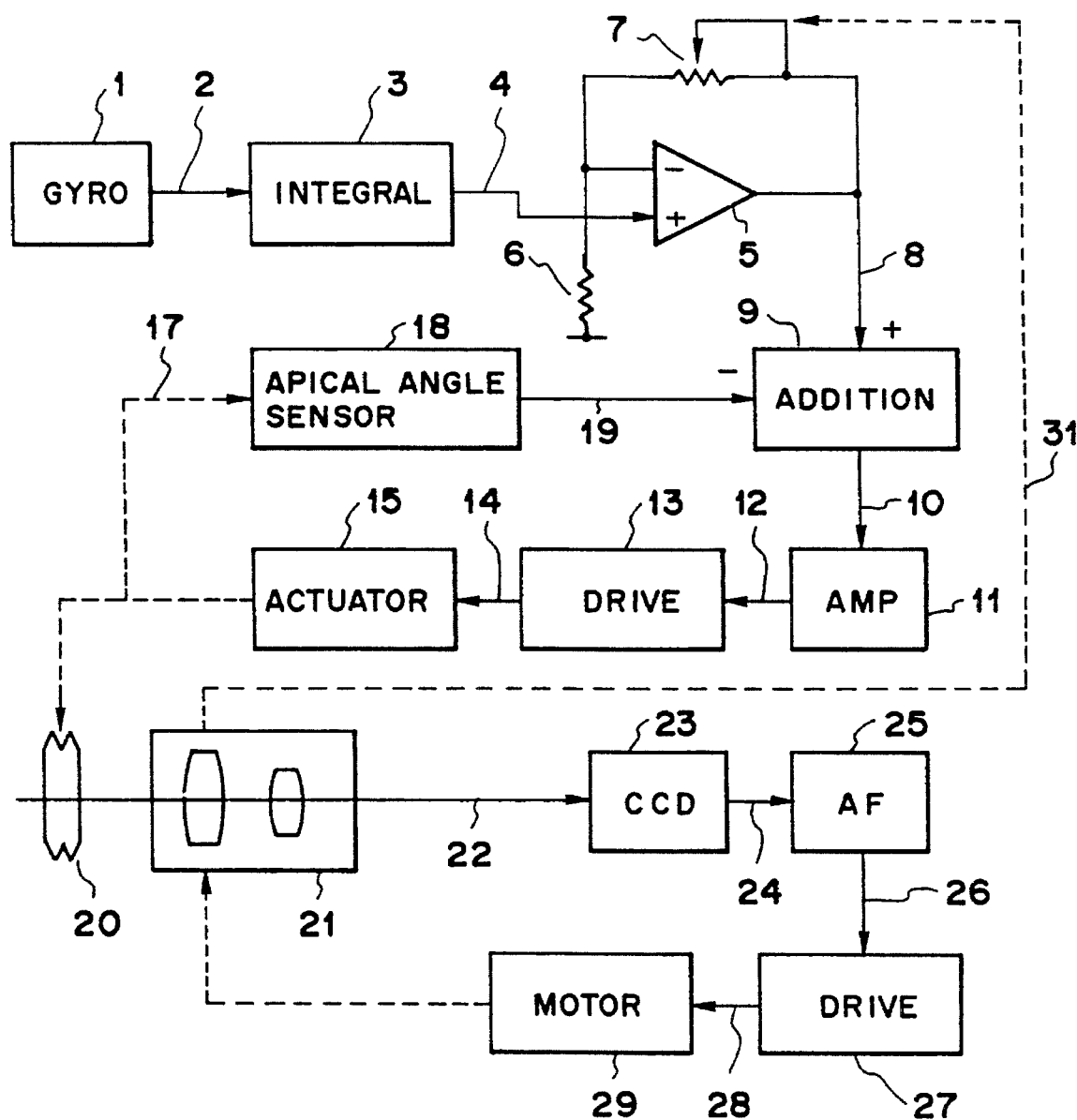
FIG. 1 is a block diagram to show the structure of an image-blur preventing apparatus in a first embodiment of the present invention.
Figure 4:
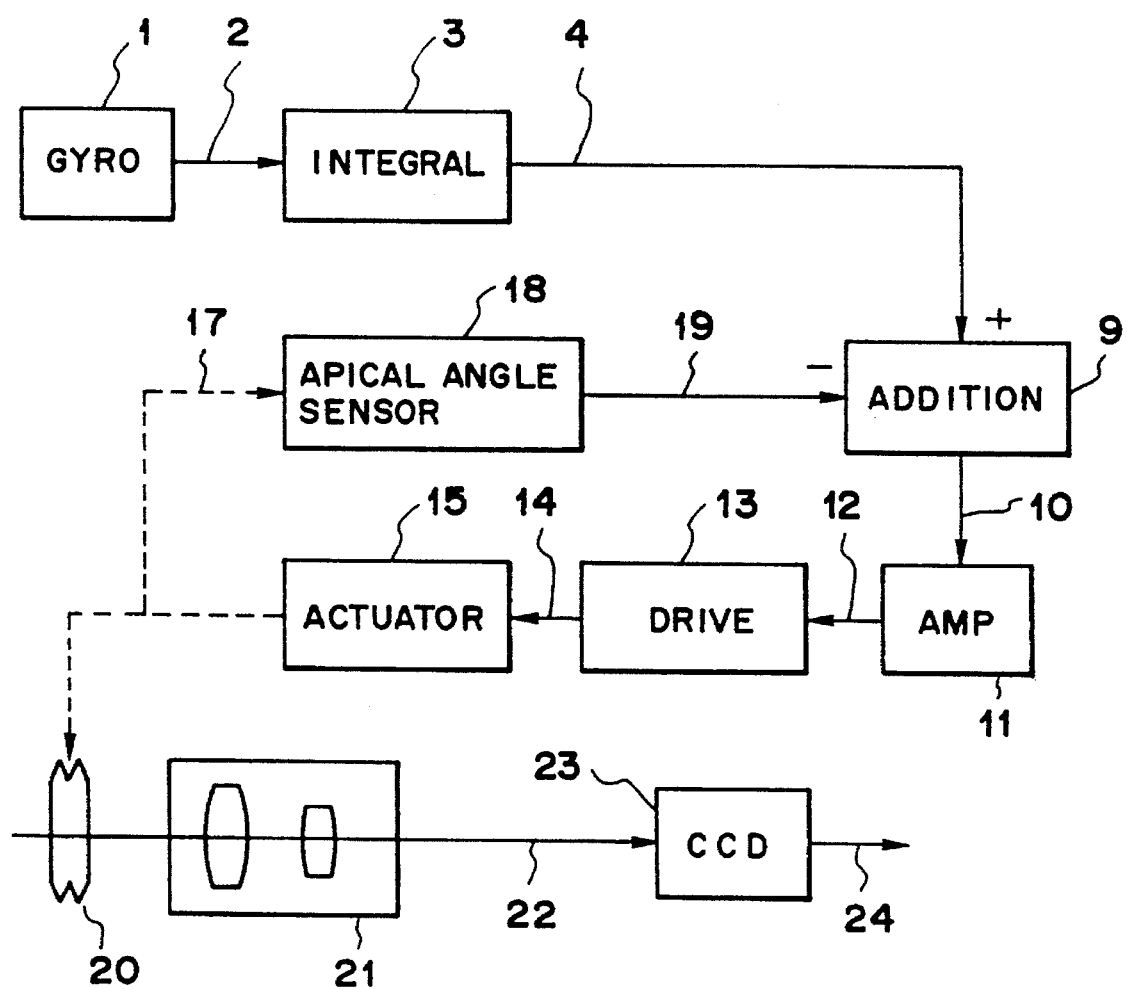
FIG. 4 is a block diagram to show the structure of a conventional image-blur preventing apparatus.

FIG. 1 is a block diagram to show the structure of the first embodiment in which an image-blur preventing apparatus of the present invention is applied to a video camera, in which elements 1–4 and 9–24 are the same as those in the conventional image-blur preventing apparatus shown in FIG. 4 and explanation of which is omitted. Described here are only points different from the conventional apparatus.

Numeral 5 denotes an operational amplifier, which constitutes a variable amplification-degree amplifier together with a resistor 6 and a feedback variable resistor 7. The amplification degree of the variable amplification-degree amplifier can be changed by changing the resistance of the variable resistor 7.

Numeral 25 denotes an autofocus detecting circuit, which receives an image signal 24 and outputs a focusing control signal 26 according to the signal 24.

Numeral 27 represents a focusing motor drive control circuit, which receives the focusing control signal 26 and outputs a focusing motor drive signal 28 according to the signal 26 to control the drive of focusing motor 29. The focusing motor 29 moves the lens 21 along the optical axis to adjust a focus state of a subject.

Further, a value of resistance of the variable resistor 7 is changed by an unrepresented interlocking member 31 which moves in synchronism with movement of lens 21 along the optical axis. In summary, an output 8 from the variable amplification-degree amplifier composed of the operational amplifier 5, the resistor 6 and the variable resistor 7 is an addition of the detection output from the shake detecting means including the vibration gyro (signal corresponding to θ) and the error angle α (that is, a signal corresponding to θ+α). Incidentally, in case the focus control to the subject is carried out as extending or retracting the lens along the optical axis, as described above, if the reference is an in-focus state with infinity, an amount of extension from that state is proportional to an inverse of a distance to the subject.

Figure 5:
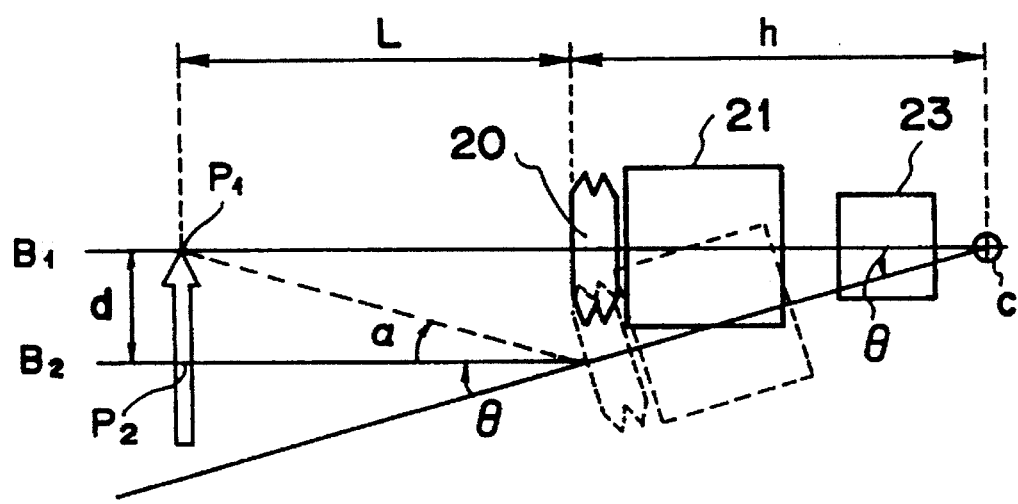
FIG. 5 is a drawing to illustrate the operation of the conventional image-blur preventing apparatus to describe the problems thereof.

Further, if the rotation center C of shake is assumed as almost fixed in FIG. 5, d is a shift amount, and h is a distance between the rotation center C of shake and the subject-side surface of VAP 20, the following two equations hold:

$$\frac{d}{L} = \tan\alpha \cong \alpha \ll 1 \text{ and}$$

$$\frac{d}{h} = \tan\theta \cong \theta \ll 1.$$

From the above equations, $$\frac{\alpha}{\theta} = \frac{h}{L} = h \cdot \frac{1}{L}.$$

From the above equation, since h is a constant which can be determined for each system, a ratio α/θ of error angle α to shake angle θ of the system is proportional to an inverse of the subject distance L.

Figure 2:
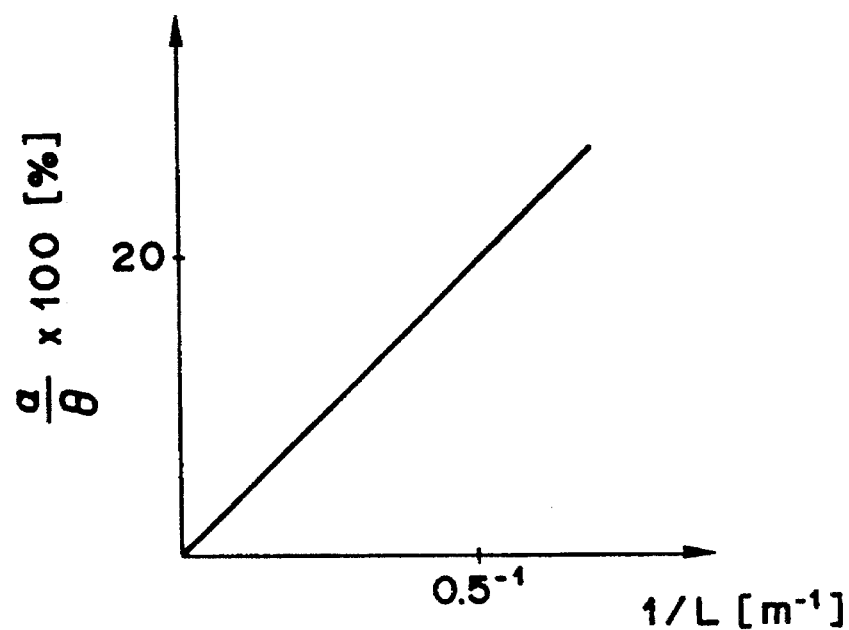
FIG. 2 is a graph to show a relation between subject distance and necessary correction angle.

Suppose in the system shown in FIG. 5 the constant h=0.1 [m] and the blur correction is effected for a subject at a position equivalent to infinity. FIG. 2 shows a relation between the ratio α/θ and the subject distance L in the image-blur preventing system set to optimize the shake angle θ detected by the shake detecting means including the vibration gyro 1 and the amount of shake correction by apical angle displacement of VAP 20 under the above conditions, in which the horizontal axis represents an inverse 1/L [m$^{-1}$] of subject distance and the vertical axis the ratio α/θ×100 [%] of error angle α to the shake angle θ of the system.

It is clearly seen from FIG. 2 that the inverse 1/L of subject distance is proportional to the ratio α/θ×100 of the angle α to the shake angle θ.

Then, the amount of lens extension from the infinity position and the ratio of α to the shake angle θ both are proportional to the inverse of subject distance, and therefore are proportional to each other.

From FIG. 2, correction needed (α/θ×100) is 0 (%) when the subject distance L is infinity (1/L≃0), while the correction need is about 1% when the subject distance is 10 m. Further, in case the subject distance approaches 0.5 m, the correction needed is about 20%.

Taking this fact into account, the present invention enables correction of the error angle α, which was the problem in the conventional apparatus, by correcting the shake detection output (a signal corresponding to θ) in accordance with the amount of lens extension.

Now described briefly is the image blur prevention function of the video camera in FIG. 1.

When an operator imparts a shake of angle θ (see FIG. 5) to the video camera, the vibration gyro 1 detects an angular velocity caused by this shake and outputs an angular velocity signal 2 according to the angular velocity. The angular velocity signal 2 is integrated by the integration circuit 3, and the result is input into the operational amplifier 5 as an angular displacement signal 4 corresponding to the deflection angle θ. When a value of resistance corresponding to an inverse of distance to an unrepresented subject (or object) is set in the variable resistor 7 in the operational amplifier 5 by movement of the lens unit 21 or by a member generating information related to the distance to the subject (or object), the operational amplifier 5 outputs a signal corresponding to (θ+α) as described above.

If at this movement the correction operation is not yet started for VAP 20, the signal corresponding to (θ+α) is output, so that the actuator 15 drives the VAP 20 based on this signal.

When the VAP 20 is driven, the apical angle sensor 18 outputs the apical angle displacement information 17 according to the displacement of VAP 20. Then the adder 9 outputs a differential signal between the information 17 and the signal corresponding to (θ+α) from the operational amplifier 5 as described above, and then the actuator 15 further displaces the VAP 20 based on the signal according to this differential signal to deflect the beam.

The above operation continues before the deflection angle θ and error angle α are corrected, so that a beam from the point P$_1$ may enter the same position on a film (not shown) as that before the camera shake is caused, even with the shake that inclines the camera by θ, thus accomplishing the blur correction.

Further, specific numerical values are listed as follows for the resistors 6, 7 in FIG. 1. In the case of the system having the characteristics as shown in FIG. 2, supposing the value of resistance of resistor 6 is R [Ω] for example, the resistance of the variable resistor 7 is R [Ω] when the lens is located at a position corresponding to a distance to the subject being infinity, the resistance of the variable resistor 7 is 1.2 R [Ω] when the lens is extended to a position corresponding to the distance of subject being 0.5 [m], and between the two positions the resistance is set to be a linear function of the inverse of distance to subject, whereby excellent results may be obtained.

Second Embodiment

Figure 3:
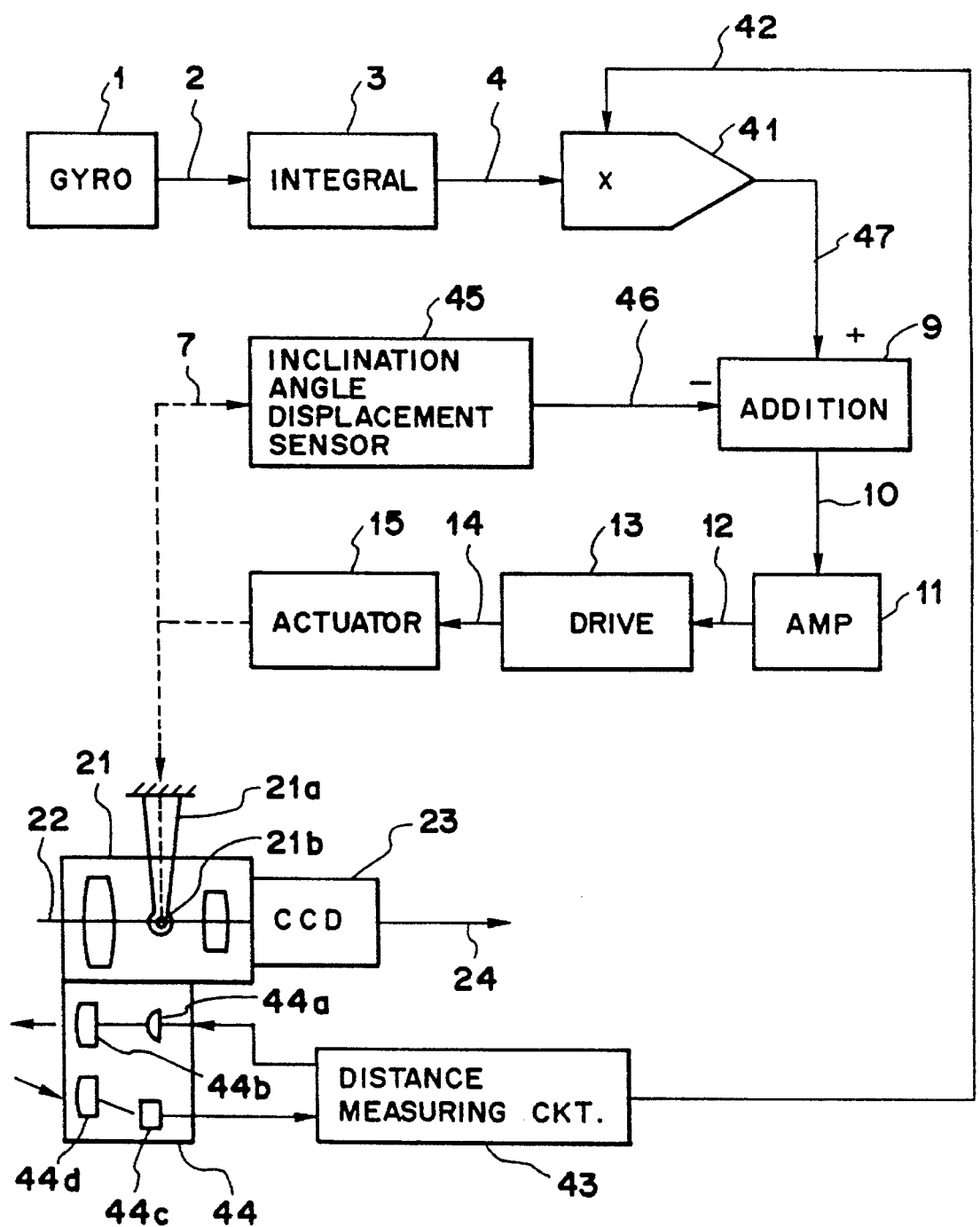
FIG. 3 is a block diagram to show the structure of an image-blur preventing apparatus in a second embodiment of the present invention.

FIG. 3 is a block diagram to show the structure of the second embodiment in which the image-blur preventing apparatus of the present invention is applied to a video camera.

In the present embodiment, the correction optical means for deflecting the beam is one having the structure in which a lens and an image pickup device incorporated with each other are driven, in which the means for correcting the shake detection signal is an analog multiplication circuit which electrically changes the degree of amplification, and in which the means for obtaining subject distance information is a distance measuring mechanism including an infrared light emitting diode and PSD (position sensor).

In FIG. 3, elements 1–4 and 9–27 are the same as those in FIG. 1 showing the structure of the first embodiment and therefore only points different therefrom are described herein.

A lens unit 21 and an image pickup device 23 are incorporated with each other and the lens unit 21 is supported as rotatable about a rotation shaft 21b relative to a support member 21a. A drive force of actuator 15 is transmitted to the lens unit 21 to rotate it about the rotation shaft 21b, thus performing the blur correction operation.

Numeral 44 denotes a distance measuring mechanism, which is incorporated with the lens 21 and the image pickup device 23. The distance measuring mechanism is constructed such that an infrared light emitting diode 44a and a projection lens 44b project an infrared beam to irradiate a subject and such that a reflection beam of the infrared beam passes through a receiving lens 44d to be focused at a position corresponding to the subject distance on PSD 44c. The PSD 44c converts the obtained light signal into an electric signal, and the distance measuring circuit 43 processes the electric signal to obtain subject distance information and then outputs the information as a subject distance signal 42.

Numeral 41 denotes an analog multiplier, which electrically changes its value of multiplication according to the subject distance signal 42 and multiplies the angular displacement signal 4 by the value of multiplication at its degree of amplification to output a multiplication signal 47.

Numeral 45 is an inclination angle displacement sensor for detecting an inclination angle displacement of the lens unit 21, which outputs an inclination angle displacement signal 46 according to the displacement.

Next described briefly is the function of image blur prevention by the video camera in FIG. 3.

When an operator imparts a shake of angle θ (see FIG. 5) to the video camera, the vibration gyro 1 detects an angular velocity caused by the shake and outputs an angular velocity signal 2 according to the angular velocity. The angular velocity signal 2 is integrated by the integration circuit 3, and the integration result is input into the analog multiplier 41 as an angular displacement signal 4 according to the deflection angle θ. The distance measuring mechanism 44 and the distance measuring circuit 43 obtain information related to a distance to an unrepresented subject (or object) and then the distance measuring circuit 43 outputs a signal 42 according to the distance to the variable resistor in the analog multiplier 41. When the signal 42 is input into the analog multiplier 41 and a value of multiplication corresponding to the inverse of distance to subject (or object) is set, the analog multiplier 41 outputs a signal (multiplication signal 47) according to (θ+α) as described above. If at this movement the correction operation is not yet started for VAP 20, a signal corresponding to (θ+α) is output and the actuator 15 drives the lens unit 21 based on the signal.

When the lens unit 21 is driven, the inclination angle displacement sensor 45 outputs to the adder 9 inclination angle displacement signal information 46 according to the displacement of VAP. Then the adder 9 outputs a differential signal between this information 46 and the signal corresponding to (θ+α) from the analog multiplier 41 as described above, so that the actuator 15 continues displacing the lens unit 21 based on the signal corresponding to this differential signal to deflect the beam.

The above operation is continued before the deflection angle θ and the error angle α are corrected, so that a beam from the point $P_1$ enters the same position on a film (not shown) as that before the camera shake is caused, though the camera is inclined by θ because of the shake, thus completing the blur correction.

Further, specific numerical values are listed below for setting of the distance measuring circuit 43 and the analog multiplier 41.

Let us consider the system having the characteristics as shown in FIG. 2. For the distance measuring circuit 43, for example, a subject distance signal 42 a voltage signal is 1.0 [V] when the distance to the subject is infinity, 1.2 [V] for 0.5 [m], and between the two points, the distance measuring circuit 43 is set such that the voltage value becomes a linear function of the inverse of distance to the subject. Further, for the analog multiplier 41, the multiplication value is 1 when the voltage value of subject distance signal 42 is 1 [V], 1.2 when the voltage value is 1.2 [V], and in general the multiplication value is set to n when the voltage value of subject distance signal 42 is n [V], whereby excellent results may be obtained.

According to the embodiments of the present invention as described above, it is not the case that the correction effect of camera shake changes (or is degraded) depending upon the subject distance, and therefore the best correction effect can be always expected for a subject. This improvement in effect is great especially in the near range shooting.

Although the above embodiments employed the image-blur preventing means such as the variable angle prism or one having the optical means and the image pickup device incorporated with each other and angle-displaced to effect the correction, the invention is not limited to these examples. For example, another image-blur preventing means may be one in which optical means is moved in a plane perpendicular to the optical axis to effect correction.

Also, although the above embodiments employed shake detecting means such as the vibration gyro, the means may be replaced by another angular velocity meter or another sensor, for example an angular displacement meter, an angular acceleration meter, etc.

Further, although the above embodiments showed the examples in which the image-shake preventing means is applied to a video camera, it may be applied to a silver-salt camera or another optical instrument. Additionally, the image-blur preventing means may be set in a video camera or a silver-salt camera, or in an interchangeable lens or an adapter which is detachably mounted on a video camera or a silver-salt camera.

What is claimed is:

1. An apparatus usable with an image blur prevention device for preventing image blur in an imaging system that forms an image, said apparatus comprising:

first input means for inputting a first signal corresponding to a distance to an object that is a subject of the imaging system;

second input means for inputting a second signal corresponding to an angular changing state of the imaging system; and signal processing means for determining image blur based on the first signal and the second signal input, respectively, by said first input means and said second input means, the image blur including an image blur corresponding to a distance between the image blur prevention device and a rotational center of the imaging system.

2. An apparatus according to claim 1, wherein the image blur prevention device comprises an image blur prevention portion, said signal processing means comprising means for obtaining an output signal of the image blur prevention portion based on the first signal and the second signal.

3. An apparatus according to claim 2, wherein said signal processing means further comprises changing means for changing, based on the first signal, a relation between the second signal and the output signal.

4. An apparatus according to claim 3, wherein said changing means increases the output signal in accordance with a change in the first signal corresponding to the distance to the object being shortened.

5. An apparatus according to claim 2, wherein the image blur prevention portion comprises means for preventing image blur by changing a relation between the image formed by the imaging system and an imaging plane of the imaging system.

6. An apparatus according to claim 5, wherein the image blur prevention portion further comprises means for preventing image blur by moving the image formed by the imaging system relative to an absolute space.

7. An apparatus according to claim 5, wherein the image blur prevention portion further comprises means for deflecting a light beam.

8. An apparatus according to claim 6, wherein the image blur prevention portion further comprises means for deflecting a light beam.

9. An apparatus according to claim 1, wherein said apparatus is usable with a focus adjustment device for performing focus adjustment and the image blur prevention device comprises means for performing image blur prevention for an image being focus adjusted by the focus adjustment device, and wherein the first signal corresponds to a state of focus adjustment by the focus adjustment device.

10. An apparatus according to claim 9, wherein the focus adjustment device comprises a focus adjustment optical system, and wherein said first input means comprises means for inputting a signal corresponding to a movement state of the focus adjustment optical system.

11. An apparatus according to claim 10, wherein the focus adjustment optical system is disposed in the imaging system.

12. An apparatus according to claim 1, wherein said second input means comprises means for inputting a signal corresponding to an angular deviation of the imaging system.

13. An apparatus according to claim 1, wherein said apparatus is usable with an angular changing state detection device for detecting an angular changing state, and wherein said second input means comprises means for inputting an output of the angular changing state detection device.

14. An apparatus according to claim 13, wherein the angular changing state detection device comprises an angular velocity sensor for detecting an angular velocity.

15. An apparatus according to claim 14, wherein the angular changing state detection device further comprises an integrating circuit for integrating an output of the angular velocity sensor.

16. An apparatus according to claim 13, wherein said apparatus further comprises the angular changing state detection device.

17. An apparatus according to claim 1, wherein said apparatus further comprises means for disposing said apparatus in the image blur prevention device.

18. An apparatus according to claim 1, wherein said apparatus further comprises means for disposing said apparatus in optical equipment.

19. An apparatus according to claim 18, wherein said apparatus further comprises means for disposing said apparatus in a camera.

20. An image blur prevention apparatus usable with an imaging system for forming an image, said image blur prevention apparatus comprising:

image blur prevention means for preventing image blur;

first input means for inputting a first signal corresponding to a distance to an object that is a subject of the imaging system;

second input means for inputting a second signal corresponding to an angular changing state of the imaging system; and driving control means for causing said image blur prevention means to perform an operation for preventing image blur based on the first signal and the second signal input, respectively, by said first input means and said second input means, the image blur including an image blur corresponding to a distance between said image blur prevention means and a rotational center of the imaging system.

21. An image blur prevention apparatus according to claim 20, wherein said driving control means comprises changing means for changing, based on the first signal, a relation between the second signal and the operation performed by said image blur prevention means.

22. An image blur prevention apparatus according to claim 21, wherein said changing means increases the operation performed by said image blur prevention means in accordance with a change in the first signal corresponding to the distance to the object being shortened.

23. An image blur prevention apparatus according to claim 20, wherein said image blur prevention means comprises means for preventing image blur by changing a relation between the image formed by the imaging system and an imaging plane of the imaging system.

24. An image blur prevention apparatus according to claim 23, wherein said image blur prevention means further comprises means for preventing image blur by moving the image formed by the imaging system relative to an absolute space.

25. An image blur prevention apparatus according to claim 23, wherein said image blur prevention means further comprises means for deflecting a light beam.

26. An image blur prevention apparatus according to claim 24, wherein said image blur prevention means further comprises means for deflecting a light beam.

27. An image blur prevention apparatus according to claim 20, wherein said image blur prevention apparatus is usable with an angular changing state detection device for detecting an angular changing state, and wherein said second input means comprises means for inputting an output of the angular changing state detection device.

28. An image blur prevention apparatus according to claim 27, wherein said image blur prevention apparatus comprises the angular changing state detection device.

* * * * *

UNITED STATES PATENT AND TRADEMARK OFFICE
CERTIFICATE OF CORRECTION

PATENT NO. : 5,459,542

DATED : October 17, 1995

INVENTOR(S) : AKIHIRO FUJIWARA, ET AL.

It is certified that error appears in the above-indentified patent and that said Letters Patent is hereby corrected as shown below:

Column 1

Line 34, "example" should read --example,--.
Line 59, "CCD 223" should read --CCD 23--.
Line 58, "beam 222" should read --beam 22--.

Column 2

Line 4, "VAP 220" should read --VAP 20--.
Line 5, "lens 221" should read --lens 21--.
Line 6 and 7, "8" should read --θ--.
Line 11, "however" should read --however,--; and "the correction is" should be deleted.
Line 22, "occurrence" should read --occurrence of--.

Column 6

Line 54, "employed" should read --employ--.

Signed and Sealed this

Seventh Day of May, 1996

Attest:

BRUCE LEHMAN

Attesting Officer

Commissioner of Patents and Trademarks